Dec. 13, 1949  J. DE RUGERIS  2,491,165
ELECTRIC SOLDER-FEEDING IRON
Filed April 5, 1946  3 Sheets-Sheet 1
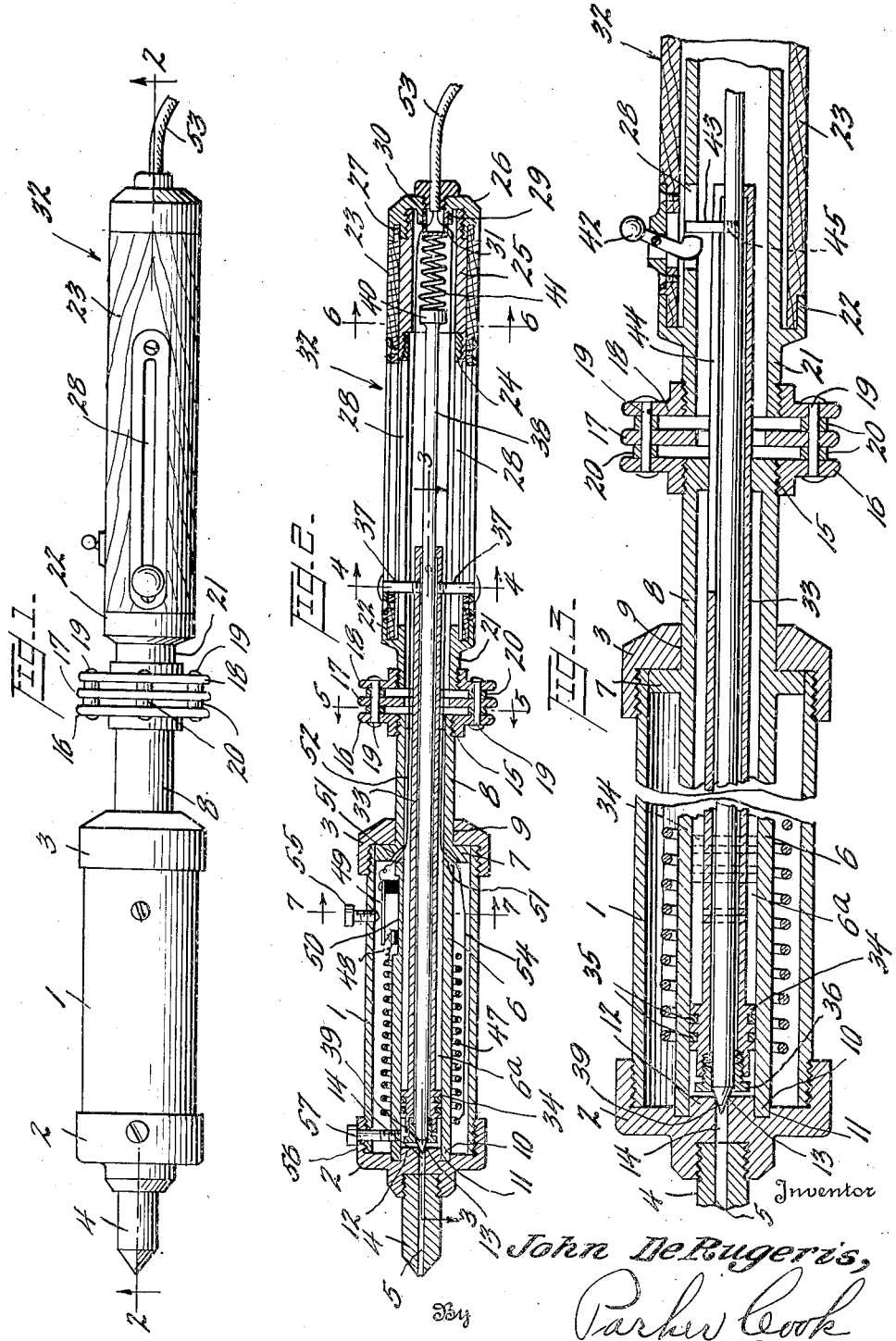
Inventor
John DeRugeris,
By Parker Cook
Attorney

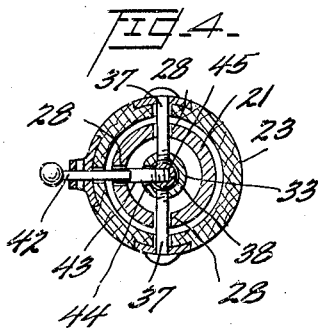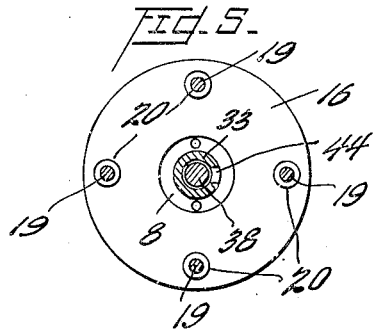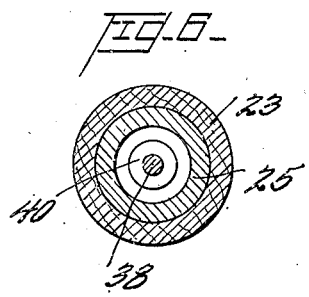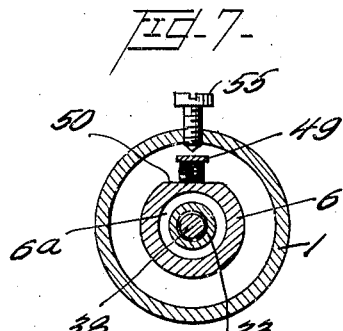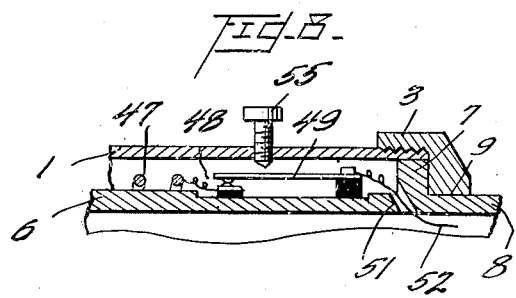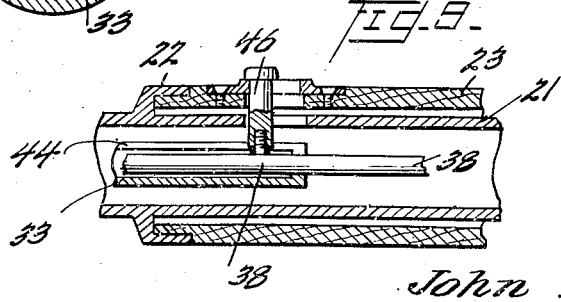
Inventor
John DeRugeris,
By Parker Cook
Attorney Dec. 13, 1949     J. DE RUGERIS     2,491,165
ELECTRIC SOLDER-FEEDING IRON
Filed April 5, 1946     3 Sheets-Sheet 3
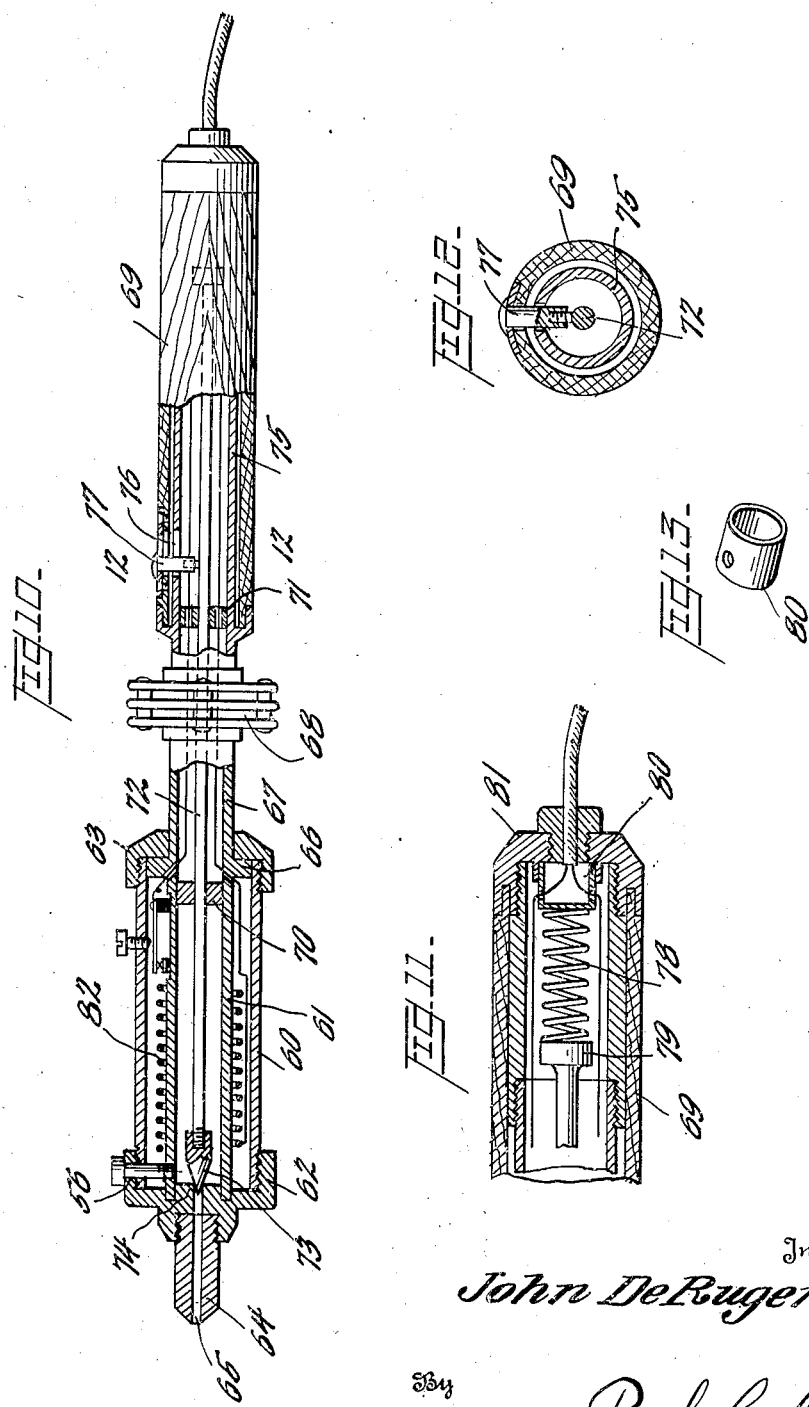
Inventor
John DeRugeris,
By Parley Cook, Attorney Patented Dec. 13, 1949

2,491,165

UNITED STATES PATENT OFFICE 2,491,165

ELECTRIC SOLDER-FEEDING IRON

John De Rugeris, Atlantic City, N. J., assignor of one-half to Jack Budnick, Pleasantville, and one-tenth to Ernest Curtis, Atlantic City, N. J.

Application April 5, 1946, Serial No. 659,906

1 Claim. (Cl. 219—27)

My invention relates to new and useful improvements in electric soldering irons and, more particularly, to an automatic filling and feeding electric soldering iron.

One of the objects of the present invention is to provide an electrically heated soldering iron provided with a reservoir chamber at its outer end, whereby a goodly supply of solder in its fluid form, or, in other words, in its heated form, may be drawn up into the said chamber by the operation of a plunger to be used later as desired.

Still another object of the invention is to provide an electrically heated soldering iron having a reservoir chamber for holding the solder, while at the end of the chamber is provided a tip provided with a central bore registering with said chamber; and to also provide a valve for said tip so that when the solder is in its heated condition within the chamber, the operator may actuate the valve to liberate the desired amount of solder through the said bore and tip.

Still another object of the invention is to provide an electrically heated soldering iron having a reservoir chamber which may be automatically filled by the operation of a suction rod or plunger by inserting the tip in solder when the solder is in its fluid form. However, the reservoir may also be filled by inserting solder in wire form through an auxiliary opening, or by pouring hot solder through said opening in to said reservoir.

Still another object of the invention is to provide a soldering iron having a suction rod and a valve rod wherein the valve rod is mounted within the suction rod, and each rod to operate independently of the other; the one for drawing in, or, in other words, filling the reservoir chamber with solder, and the other for regulating the feed of the solder while the soldering iron is in use.

Still another object of the invention is to provide an electrically heated soldering iron having a reservoir chamber for holding a supply of solder, which reservoir is to be electrically heated; and to provide an enclosed suction rod and valve rod mounted therein for respectively re-filling and releasing the solder; and to further provide means for normally holding the valve rod in its closed position.

Still another object of the invention is to provide an electrically heated soldering iron consisting of a handle, a central portion with a heat barrier therein, and a solder reservoir in which will be mounted the removable heating element and thermostat, so that the heat may be controlled; also extending in the reservoir, through the center portion and heat barrier and into the handle, are the means for drawing a supply of solder in to the reservoir, together with means for liberating the desired amount of solder during the soldering operation, these means being operated from the handle.

Still another object of the invention is to provide a modified form of electrically heated soldering iron similar in most respects to the preferred form, but with the exception that the automatic feeding means, that is, the means for drawing a supply of solder up in to the reservoir, is dispensed with.

With these and numerous other objects in view the invention consists in certain new and novel arrangements and combination of parts as will be hereinafter more fully described and pointed out in the claim.

Referring now to the drawings showing the preferred embodiment and one modification and a slightly modified form of trigger, Fig. 1 is a view in elevation of the soldering iron, Fig. 2 is a horizontal sectional view taken on line 2—2 of Fig. 1.

Fig. 3 is an enlarged fragmentary sectional view taken on line 3—3 of Fig. 2, the dotted lines showing the plunger in a retracted position, Fig. 4 is an enlarged sectional view taken on line 4—4 of Fig. 2, looking in the direction of the arrows, Fig. 5 is an enlarged sectional view taken on line 5—5 of Fig. 2, looking in the direction of the arrows, Fig. 6 is an enlarged sectional view taken on line 6—6 of Fig. 2, looking in the direction of the arrows, Fig. 7 is an enlarged sectional view taken on line 7—7 of Fig. 2, looking in the direction of the arrows, Fig. 8 is an enlarged fragmentary sectional view showing the thermostat, Fig. 9 is an enlarged fragmentary sectional view showing a slight modification of the means for operating the valve.

Fig. 10 is a sectional view of a slightly modified form of iron, part of the handle being shown in elevation and the automatic feeding means being dispensed with, Fig. 11 is a fragmentary sectional view of the proximal end of the handle, Fig. 12 is a sectional view taken on line 12—12 of Fig. 10, and Fig. 13 is a detail of the ferrule that is mounted in the cap of the handle.

Referring now more particularly to the several views and, for the moment, to Fig. 1, there is shown an outer barrel 1 which is closed at the outer or distal end by the internally threaded cap 2, and at its inner or proximal end by the internally threaded cap 3. Threaded in the cap 2 is the removable tip 4, which, as may be seen in Fig. 2, is provided with a circular, relatively small bore 5.

Located concentrically in the outer barrel 1 is an inner barrel 6 with its flange 7 and the integral stem 8, which latter extends through a central opening 9 in the cap 3. The flange 7 fits tightly against the inner surface of the cap 3.

The lower end 10 of the barrel 6 fits tightly in a circular groove 11 formed internally of the cap 2, while centrally of this internal groove 11 the cap is slightly thicker to form the inwardly projection 12, in which in turn there is centrally provided the valve seat 13 and the orifice 14, that registers with the bore 5 of the tip 4.

The inner barrel 6 thus provides an inner chamber 6a in which the fluid solder is to be held, and this chamber also acts as the cylinder walls for a piston 34 later to be described.

The stem 8 is externally threaded as at 15 and is to be threaded within a plate 16. There is also a central plate 17 and an opposite end plate 18, which plates are held by bolts 19 positioned around the periphery of the plates, there being spacers 20 between the several plates, so that these plates 16, 17 and 18 form an air gap or barrier for the heat that will be conducted by the stem 8. All three of the plates have a central opening as a piston rod 33 is to extend through them, as will be shortly mentioned.

Threaded within the end plate 18 is also the metal sleeve 21 about which will be an integral or welded cap 22 so that a wooden covering handle portion 23 may have its one end fitted in this cap 22. Also located at the opposite end 24 of the sleeve 21 is beaded a collar or sleeve 25 over the proximal end of which is threaded a cap 26, this cap also having an internal groove 27 in which the other end of the wooden covering 23 may be fitted.

The sleeve 21 is provided with three elongated slots 28 so that an operating trigger and bolts may extend through these slots, as will be later mentioned.

Referring for a moment to the cap 26, it will be noticed that it is provided with an internal circular flange 29 so that a small loosely mounted ferrule 30 may be set within this circular flange. This ferrule 30 is provided with oppositely positioned openings 31, so that the wires, also to be later mentioned, may pass through these openings and centrally of the ferrule and out to an electric cord, to be later mentioned. Thus the cap 26 may be screwed in place or removed without twisting the lead wires.

Referring now to the operating mechanism located within the inner barrel 6 and extending up into the handle 32 and through the several parts that form this handle 32, there will be noticed the hollow piston rod 33 near the one end of which is located the small piston 34 with its asbestos rings 35, while in the outer end of the piston rod 33 there is located the gland or packing nut 36, which provides against a leakage of the air through the piston 34 and also centers the valve rod later to be mentioned.

It will be noticed that the piston rod 33 extends substantially throughout the length of the inner barrel 6, the stem 8, and well up into the handle 32. Extending radially within the free end of the piston rod 33 are the diametrically disposed beaded bolts 37 which pass through two of the oppositely disposed elongated slots 28 formed in a metal sleeve 21, which in turn forms a part of the handle 32.

These bolts 37 also, of course, extend through the wooden covering handle portion 23.

Thus to operate the piston rod 33 and its piston 34 it is only necessary to grasp the projecting beads of the bolts 37 and move them rearwardly to thus retract the piston 34 and cause a vacuum or suction within the cylinder 6a.

Now to provide a valve for releasing the solder as wanted from the chamber 6a, there may be seen the valve rod 38 which is pointed at its forward end 39 to engage the valve seat 13 formed in the projection 12 in cap 2. The valve rod 38 extends, of course, through the gland nut 36 up through the hollow piston rod 33 and has the head 40 on its end. Bearing against the head 40 is the spring 41 which is under relatively heavy compression and also bears against the ferrule 36, so that normally the valve rod 38 is always in its closed position; or, in other words, this spring holds the valve 39 against the valve seat 13. The spring 41 must be strong enough so that even when the piston rod 33 is retracted by moving the bolts 37 to retract the piston 34, it will not retract the valve rod 38.

To retract the valve rod 38 there may be seen the small headed trigger 42 pivotally mounted in the handle 32, the lower end of the trigger passing through one of the elongated slots 28 of the sleeve 21 to engage a pin 43 that passes through an elongated slot 44 formed in the wall of the hollow piston rod 33 and is secured in a threaded opening 45 formed in the valve rod 38 as may readily be seen in Fig. 3.

Thus when it is desired to fill or refill the inner chamber 6a with solder, the tip 4 will be dipped in some hot solder, the trigger 42 pushed forwardly (Fig. 3) to draw the valve 39 away from its seat 13, and then the bolts 37 that operate the piston 34 will be retracted by hand to thus draw solder up into the chamber 6a after which the trigger 42 will be released so that the valve 39 will again be in its closed position.

Thereafter, when desired to feed the solder through the tip 4, it will only be necessary to momentarily operate the trigger 42 and the longer the trigger 42 is held in its advanced position the more solder will flow through the tip 4.

If it is necessary sometime to work with the soldering iron held in an elevated position, besides operating the trigger 42, the piston 34 might be advanced slightly to in turn force the solder out through the tip 4.

In Fig. 9, there is shown a slightly modified form of trigger means, and, in this instance, I simply provide a headed pin 46 that is connected to the valve rod 38 rather than use a pivotal trigger. This, of course, is operated in the same manner as the trigger 42 but inasmuch as the trigger 42 shown in the preferred form is not normally in contact with its pin 43, there is less possibility of the trigger being hot to the touch than there is where the pin 46 is used.

As far as the specification has proceeded there has been described the construction of the iron, the means for refilling it, and the means for dispensing the solder; and now a brief reference is made to the means for heating the iron.

Referring for the moment to Fig. 2, there is shown a resistance or heating coil 47 which extends about the inner barrel 6 and within the outer barrel 1. One end of the coil 47 is connected to a terminal 48 of a thermostat 49, which thermostat 49 is mounted in a slightly cut-out portion 50 on the outer surface of the inner barrel 6.

The flange 7 located at the end of the stem 8 is provided with angular opposite openings 51 extending into the stem 8, so that one lead wire 52 from the thermostat 49 will pass through one of the openings 51 and through the stem 8 up internally through the handle 32 and out through the rear cap 26 and be connected to an electric cord 53. The other lead wire 54 from the coil 47 will also pass through an opening 51 in the flange 7 and likewise through the stem 8 into the handle 32 and connect with the cord 53.

The thermostat 49 will normally be held in its closed position and a small set screw 55 is provided so that the amount of heat can be regulated before the thermostat 49 opens.

Thus it will be seen that hot solder may be drawn up into the soldering iron through the tip 4 and be kept in its heated fluid condition by the heat from the heating coil 47.

Furthermore, inasmuch as it might happen that it was inconvenient to heat the solder to fill the soldering iron, I have provided auxiliary means for filling by providing an opening 56 radially of the cap 2, the outer barrel 1 and the inner barrel 6, together with a set screw 57 so that solder in a wire form or other form may be placed within the inner chamber 6a. Also, hot solder might be poured through this opening 56 in case for any reason the piston 34 should ever fail in operation. Thus the soldering iron could be used until such time as it was repaired.

Referring now to the modified form shown in Fig. 10, the construction of the soldering iron is substantially the same with the exception, however, that the plunger or piston rod 33 with its piston 34 is eliminated, and two bushings or sleeves 70 and 71 substituted for holding the piston rod 33 in its central position. In this instance, of course, the solder will have to be supplied through the auxiliary opening 56 rather than drawn up through the tip 4.

Referring now specifically to the construction, there is shown an identical outer barrel 60, internal barrel 61, lower cap 62, upper cap 63, tip 64, bore 65, flange 66, and stem 67. There is likewise the air gap 68 and the handle 69. All of the parts are identical with the preferred form. However, mounted within the inner barrel 61 there is shown the bushing 70 and in the handle portion 69 is a like bushing 71. Operable through these bushings is the valve stem 72 with its point 73 that opens and closes against the valve seat 74 in the inner end of the tip 64. In this instance, the internal sleeve 75 and the handle 69 is provided with only one slot 76, so that the pin 77 may project therethrough. The pin 77 is secured to the valve stem 72. There is, of course, the compression spring 78 bearing against the head 79 of the valve stem 72 and also against the ferrule 80 mounted in the rear cap 81. The heating coil 82 and the rest of the wiring is identical with the preferred form.

As heretofore mentioned, the solder when used with this form of iron will have to be fed through the auxiliary opening 56.

It will be understood that this iron is somewhat lighter than the preferred form, in that the piston rod, piston, gland nut and trigger means are eliminated. The bushings 70 and 71 are the only additional weight and these, of course, are much lighter than the refilling means heretofore described.

From the foregoing, it will be seen that I have provided in the preferred form an automatic feeding and automatic filling, electrically heated soldering iron, so that, after the same is once filled, it may be used for many hours before it is again necessary to fill the same.

Furthermore, the reservoir may be filled through the auxiliary openings if ever found necessary. Also, by providing the air gap between the chamber and the handle most of the heat will be dissipated, so that the handle may always be cool enough to handle the iron.

It will also be noticed that all of the parts may be quickly assembled or disassembled if ever necessary to repair or renew any of the different elements. Also, as shown in the modified form, all the advantages of construction are retained with the exception of the automatic refilling means, but this is sometimes desirable in a very small or light-weight iron.

Having thus described my invention, what I claim is new and desire to secure by Letters Patent is:

In an electric soldering iron, a barrel, a stem, a hollow handle, plunger means in the barrel and extending into the stem for drawing solder into the barrel, a valve rod and valve mounted in the plunger for regulating the flow of solder from the barrel, a spring in the handle for normally holding the valve rod and valve in a closed position, a threaded cap on the end of the handle, a loosely mounted ferrule in said threaded cap against which said spring also bears, electric heating means in the barrel, wires extending from said heating means and passing through openings in said ferrule and through said threaded cap, whereby a movement of said threaded cap will not move the ferrule or twist the wires.

JOHN DE RUGERIS.

REFERENCES CITED

The following references are of record in the file of this patent:

UNITED STATES PATENTS

| Number | Name | Date |
|---|---|---|
| 431,439 | Coffin | July 1, 1890 |
| 689,318 | Lee | Dec. 17, 1901 |
| 826,976 | Wagner et al. | July 24, 1906 |
| 1,400,148 | Frum | Dec. 13, 1921 |
| 2,025,509 | Hieber | Dec. 24, 1935 |
| 2,101,445 | Moore | Dec. 7, 1937 |
| 2,147,981 | Kuehl | Feb. 21, 1939 |